Figure 1:
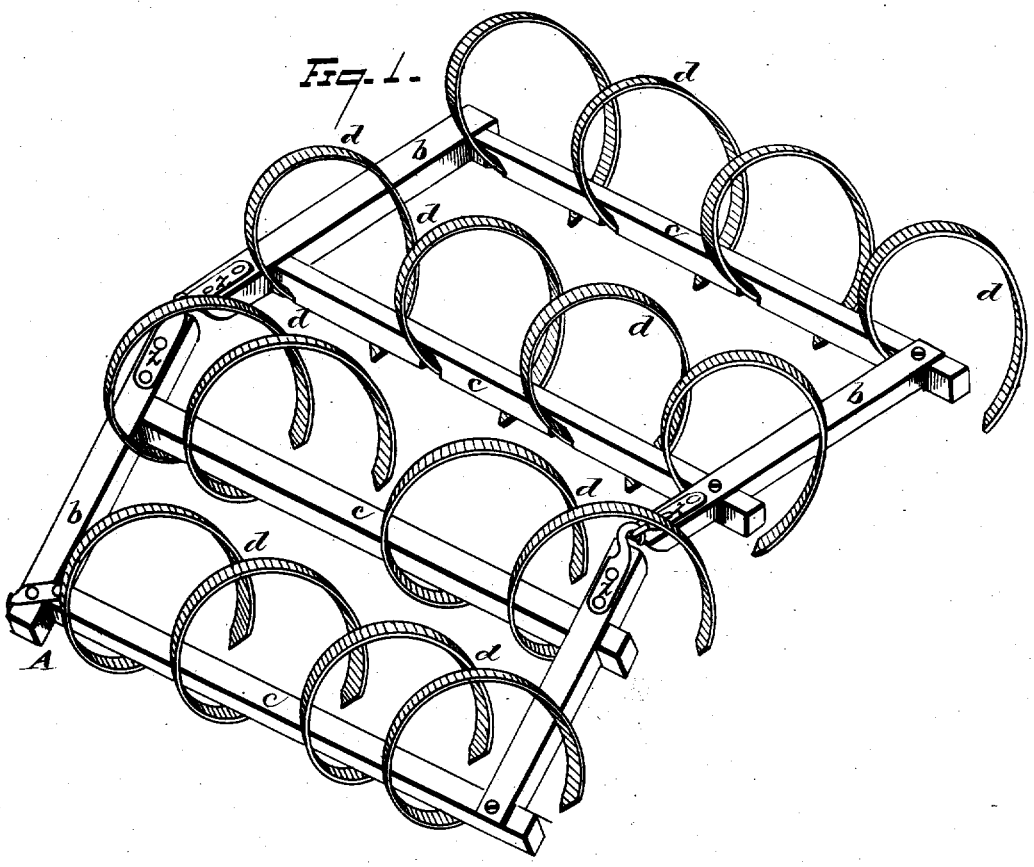

D. L. GARVER,

Assignor to D. C. & H. C. REED & Co.

Harrow.

No. 9,148. Reissued April 13, 1880.

WITNESSES

E. J. Nottingham

A. M. Bright

INVENTOR

D. L. Garver.

By Seagatt & Seagatt,

ATTORNEYS.

N. PETERS, Photo-Lithographer, Washington, D. C.

UNITED STATES PATENT OFFICE.

DAVID L. GARVER, OF HART, MICHIGAN, ASSIGNOR TO D. C. & H. C. REED & CO.

HARROW.

SPECIFICATION forming part of Reissued Letters Patent No. 9,148, dated April 13, 1880.

Original No. 95,458, dated October 5, 1869; Reissue No. 8,142, dated March 26, 1878. Application for reissue filed May 29, 1879.

*To all whom it may concern:*

Be it known that I, DAVID L. GARVER, of Hart, in the county of Oceana and State of Michigan, have invented a certain new and useful Improvement in Harrows, of which the following is a specification.

The objects accomplished by my invention are the following: When a tooth strikes any solid substance it rebounds or springs back and upward, thereby clearing the substance, and immediately enters the ground without interfering with the working of the other teeth. Frequent clogging is avoided, and the harrow can be moved from place to place as readily as a common sled by simply turning it over.

In the drawings is represented a harrow embodying the principle of my invention.

Figure 2:
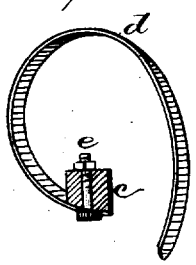
Figure 3:
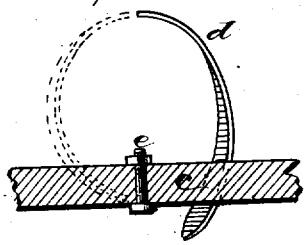

Figure 1 is a perspective view of a harrow provided with my improved harrow-teeth. Fig. 2 is a transverse sectional view of a beam of a harrow-frame, showing one of the teeth and its fastening. Fig. 3 is a longitudinal sectional view of a bar of the frame, also showing a tooth and its fastening.

A is a common harrow-frame constructed lighter than the ordinary teeth require it to be, and provided with hinges *z* at the sides *b*.

*c* are bars, to the under sides of which the teeth *d* are attached. The teeth *d* are made of spring-steel, about four feet in length, two inches in width, and one-fourth of an inch in thickness, having their points swaged in the shape of common cultivator-teeth. The teeth are then bent in a circular shape, their points being about eight inches to the rear, and extending about five or six inches below their ends. Their ends are fastened to the bar *c* by being let into the bar on the under side, so as to be even with the under surface, and are there firmly held by one or more iron bolts, *e*, provided with nut and screw, as shown in Figs. 2 and 3.

The points of the teeth incline forward and extend five or six inches below the under side of the frame. The dimensions of the teeth depend entirely upon the nature of the soil for which they are intended. If used in light sandy soil, they may be constructed shorter; if in a clay soil, they should be stiffer; and if in rough, rooty, stony ground, they should be longer than I have described them.

The shape or kind of frame or the number of teeth used is a matter of choice. Sixteen teeth are enough for a medium-sized harrow.

The construction of the teeth admits of the frame being made lighter than the frame of an ordinary harrow. Their points incline forward. They have a tendency to enter the ground when the harrow is drawn, and this tendency obviates the necessity of a heavy frame.

I am aware that prior to my invention a U-shaped cultivator has been provided with spring-shovels inserted vertically in the beams or frame, but limited in their backward movement by downward-projecting keys or wedges.

I am also aware that horse-rakes have also been provided with spring teeth or fingers, and that upon seeding-machines such teeth or fingers have been employed for scratching in the seed; but none of said devices have been constructed with two or more series of such long curved spring-teeth attached to and supporting the frame, and, so far as I am aware, I am the first ever to have produced a harrow wherein the harrow-frame is supported on two or more series of spring-teeth which are adapted to yield to an unlimited extent when in use.

What I claim is—

1. The combination, with a harrow-frame, of a curved harrow-tooth made between its point of attachment to the frame and its point of contact with the ground to extend above the frame, so as to support the frame when turned upside down.

2. A spring-metal harrow-tooth attached to a harrow-frame and curved so that the main portion of the harrow-tooth shall be located above the horizontal plane of the lower surface of said harrow-frame, substantially as and for the purpose shown.

3. A harrow-tooth of spring metal curved upward from its point of attachment to the harrow-frame, then rearward above said frame, and downward to its point of contact with the ground, substantially as and for the purpose shown.

4. A harrow-tooth made of spring metal curved forward and upward in an arch extending well above the horizontal plane of its attachment to the harrow-frame and free from contact therewith, except on the lower side of the bar supporting said tooth, substantially as and for the purpose shown.

5. The combination, with a harrow-frame, of series or rows of spring-metal teeth, curved substantially as described, mounted upon the bars or frame of the harrow, and supporting said harrow-frame, substantially as and for the purpose shown.

6. A harrow consisting of a frame carrying rows or series of spring-metal teeth adapted to have a free and unlimited yielding motion to any abnormal pressure or obstruction, substantially as and for the purpose shown.

7. A harrow consisting of a frame carrying multiple rows or series of spring-metal teeth, said teeth curved between their points of attachment to said frame and their points of contact with the soil, and adapted to pierce and enter the ground as the harrow is drawn forward, and also adapted to have a free and unlimited yielding motion throughout their entire length, substantially as and for the purpose shown.

DAVID L. GARVER.

Witnesses:
CHAUNCEY STRONG,
R. S. BABCOCK.